Dec. 1, 1970   R. D. WIGHT ET AL   3,543,600
TRANSMISSION CONTROL

Filed Oct. 7, 1968   4 Sheets-Sheet 1

INVENTORS
Robert D. Wight,
Owen R. Rittenhouse, &
BY Earl W. Glover, deceased
Ann P. Glover, executrix
a. M. Keiter
ATTORNEY INVENTORS
Robert D. Wight,
Owen R. Rittenhouse, &
BY Earl W. Glover, deceased
Ann P. Glover, executrix

ATTORNEY

Dec. 1, 1970    R. D. WIGHT ET AL    3,543,600
TRANSMISSION CONTROL
Filed Oct. 7, 1968    4 Sheets-Sheet 3

INVENTORS
Robert D. Wight,
Owen R. Rittenhouse, &
BY Earl W. Glover, deceased
Ann P. Glover, executrix
a. M. Keiter
ATTORNEY INVENTORS
Robert D. Wight,
Owen R. Rittenhouse, &
BY Earl W. Glover, deceased
Ann P. Glover, executrix

ATTORNEY

United States Patent Office 3,543,600
Patented Dec. 1, 1970

3,543,600
TRANSMISSION CONTROL
Robert D. Wight and Owen R. Rittenhouse, Saginaw, Mich., and Earl W. Glover, deceased, late of Saginaw, Mich., by Ann P. Glover, executrix, Saginaw, Mich., assignors to General Motors Corporation, Detroit, Mich., a corporation of Delaware
Filed Oct. 7, 1968, Ser. No. 766,042
Int. Cl. G05g 9/12
U.S. Cl. 74—484
16 Claims

ABSTRACT OF THE DISCLOSURE

This disclosure describes a steering column-mounted single lever, shift control assembly for automatic transmissions which may be readily converted to an assembly for use with manual transmissions by the addition thereto of a subassembly comprising relatively few parts, said parts including an additional pair of shift levers and selector means for alternately engaging the single automatic transmission lever with the pair of shift levers in response to reciprocal movement of the single lever.

---

The invention relates to automotive transmission controls and more particularly to improved linkage mounted on the steering column of a vehicle to facilitate production of control assemblies which may be used with either automatic or manually actuated transmissions.

The transmission control linkage includes a hand lever located beneath the usual steering wheel which is connected to a control tube mounted on the steering column. In the embodiment designed for automatic transmissions of the type which employ a single multiple position control, the hand lever actuates a detent mechanism and rotates the control tube.

In the control linkage embodiment designed for synchromesh transmissions of the type employing two dual-position shift levers, the hand lever is operative through a rotary housing to reciprocate and rotate the control tube. The control tube is operatively connected at its lower end to one or the other of the shift levers in a manner to be described in accordance with the invention.

An object of the invention is to provide an improved transmission control readily adaptable for use with either a manually shiftable or automatic type transmission, eliminating the need for two distinct control mechanisms.

Another object of the invention is to provide such a control which may be manufactured for use with an automatic transmission, and which may be readily converted for use with a manual transmission by the addition thereto of a dual shift lever and selector assembly.

A further object of the invention is to provide such a control which includes the conventional automatic transmission control lever and means for supplementing said lever when it is desired to use the assembly with a manual transmission.

Other objects and advantages of the invention will become more apparent when reference is made to the following specification and accompanying drawings wherein.

Figure 1:
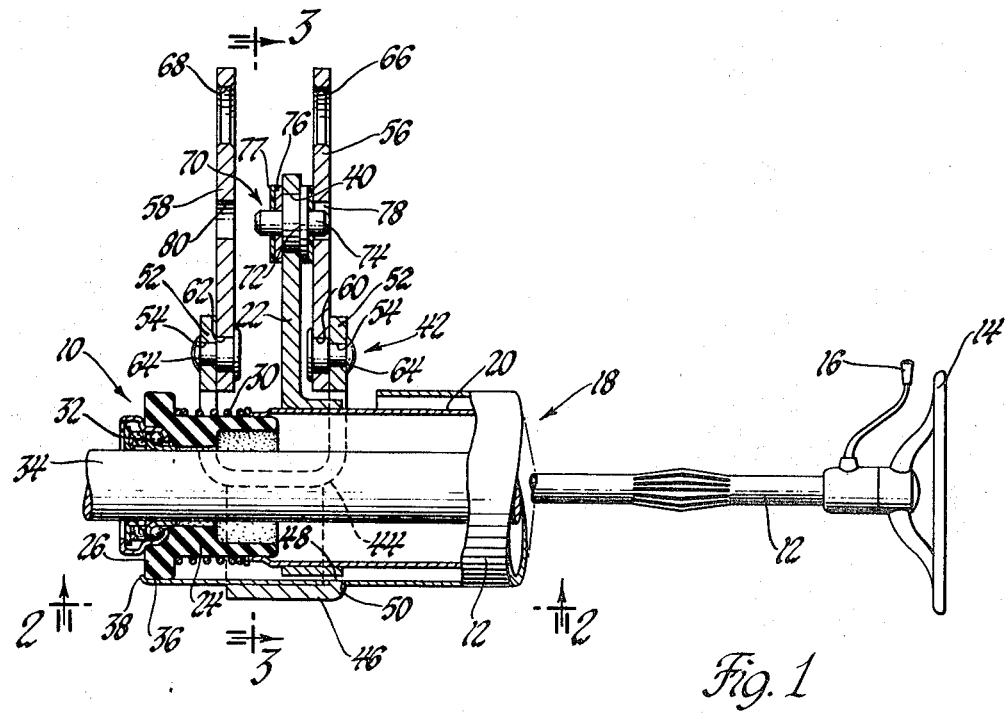
FIG. 1 is a view showing the general arrangement of a control linkage, including an enlarged fragmentary cross-sectional view of the lower control assembly embodying the invention.

Referring now to the drawings in greater detail, FIG. 1 illustrates a transmission control mechanism 10 including a steering column 12 having the usual steering wheel 14 and hand lever 16 mounted at the upper end thereof, and an enlarged view of the lower end assembly 18, the latter including the steering column 12 and a control tube 20 located concentrically therein. The automatic transmission control lever 22 is fixedly secured around the control tube 20 adjacent the lower end thereof by any suitable means.

A bushing 24 is slidably mounted within the lower open end of the control tube 20. A flange 26 is formed around one end of the bushing 24 serving as a retainer for one end of a spring 30 which surrounds the bushing 24. The lower edge of the control tube 20 serves as a retainer for the other end of the spring 30. A suitable sealed bearing 32 is mounted around the steering shaft 34 adjacent the outer end of the flange 26. The steering shaft 34 is mounted concentrically within the control tube 20. A projection 36, including a bent end 38 formed on the lower edge of the steering column 12, retains the bushing 24 in position, the spring 30 serving to urge the bushing 24 against the bent portion 38 of the projection 36.

It should be noted at this point that the structure described above would be suitable for use with an automatic transmission (not shown) simply by connecting suitable linkage (not shown) from the opening 40 formed adjacent the end of the control lever 22 to the transmission. When it becomes necessary to use the control mechanism 10 with a manual transmission, a synchromesh package assembly 42 is added to the lower control assembly 18, as will now be described.

Figure 2:
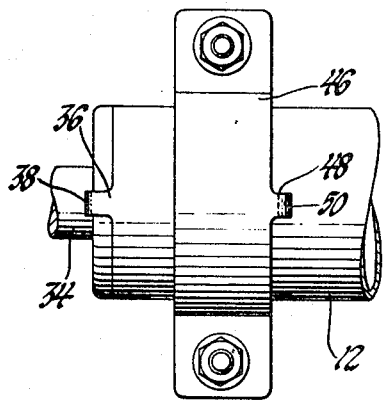
FIG. 2 is a view taken along the plane of line 2—2 of FIG. 1, as if FIG. 1 were a full round view, and looking in the direction of the arrows.
Figure 3:
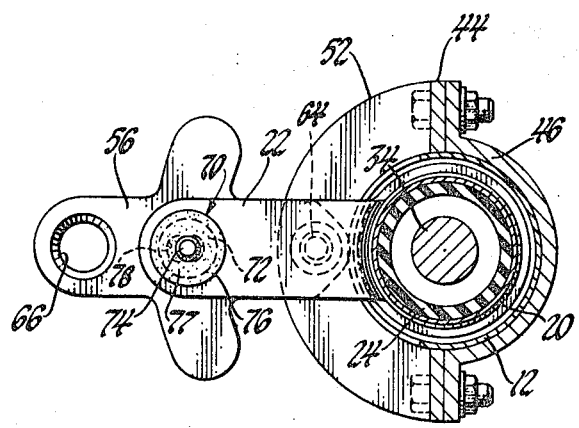
FIG. 3 is a view taken along the plane of line 3—3 of FIG. 1, as if FIG. 1 were a full round view, and looking in the direction of the arrows.
Figure 4:
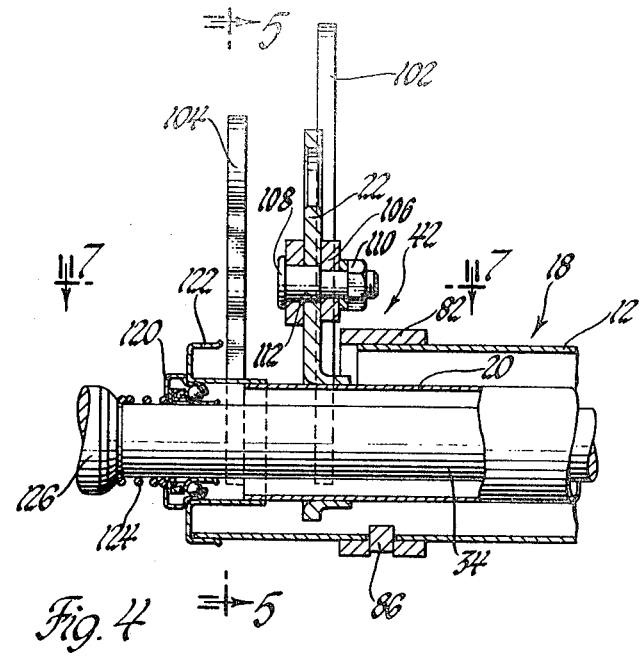
FIG. 4 is a fragmentary cross-sectional view of the lower control assembly illustrating a modification of the invention.
Figure 5:
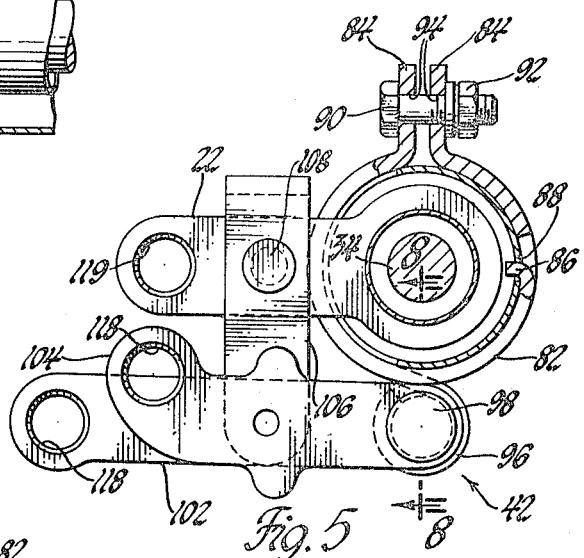
FIG. 5 is a view taken along the plane of line 5—5 of FIG. 4, as if FIG. 4 were a full round view, and looking in the direction of the arrows.
Figure 6:
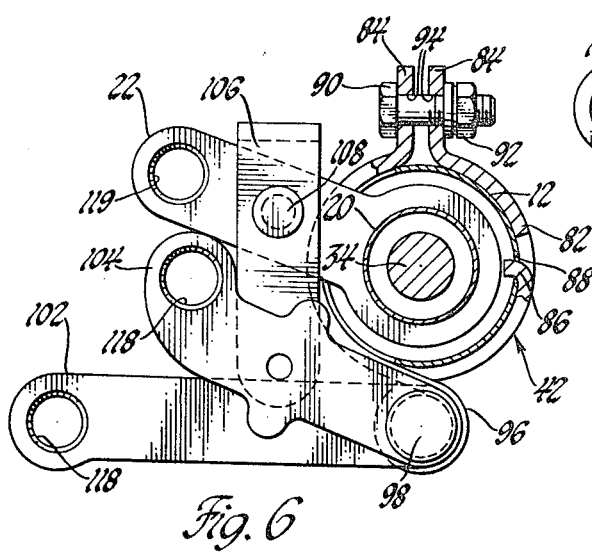
FIG. 6 is a view similar to FIG. 5 except that a portion thereof is illustrated in a different position.
Figure 7:
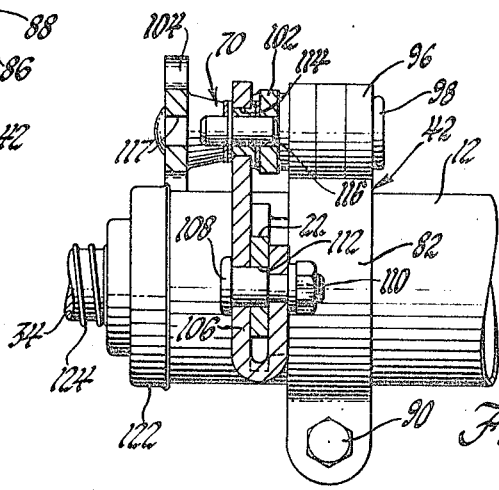
FIG. 7 is a view taken along the plane of line 7—7 of FIG. 4, as if FIG. 4 were a full round view, and looking in the direction of the arrows.
Figure 8:
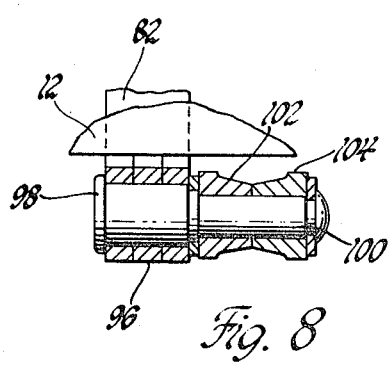
FIG. 8 is a fragmentary cross-sectional view taken along the plane of line 8—8 of FIG. 5, and looking in the direction of the arrows.

As illustrated in FIGS. 1, 2 and 3, the synchromesh package assembly 42 includes upper and lower brackets 44 and 46 which may be mounted around the steering column 12 adjacent the control lever 22. A suitable tongue 48 is formed on an edge of the lower bracket 46 for insertion in an indentation 50 formed on the steering column 12, in order to prevent rotation of the bracket 46. The upper bracket 44 includes two semicircular flanges 52 which straddle the control lever 22. An opening 54 is formed through the centermost portion of each of the flanges 52. Shift levers 56 and 58, including openings 60 and 62, respectively, are rotatably connected to the flanges 52 by any suitable means, such as a rivet 64 which may be inserted through the openings 54, 60 and 62. The shift lever 56, which is mounted on the steering wheel side of the control lever 22, may be connected to the second and third gears of a synchromesh transmission (not shown), the connection being made at the opening 66 formed near the outer end of the lever 56. The other lever 58, mounted on the opposite side of the control lever 22, may be connected to the reverse and first gears of a synchromesh transmission (not shown) by means of a similar opening 68 formed near the outer end thereof.

A selector pin assembly 70 is mounted on the control lever 22 in the opening 40 which would normally serve to connect the control lever 22 to the automatic transmission. The selector pin assembly 70 includes a flanged bushing 72, the body of which is inserted into the opening 40, a pin 74 which, in turn, is inserted through the flanged bushing 72, as by press-fitting therein, and a retainer 76 mounted around the pin 74 and against the control lever 22 on the side opposite the flange. The flange of bushing 72 and the outer face of the retainer 76 may be covered with any suitable material, such as nylon 77. It may be noted that as the control tube 20 is moved axially, the control lever 22 will be moved such that the pin 74 will engage either the opening 78 or the opening 80 formed in the levers 56 and 58, respectively, for the desired gear selection.

Insofar as the over-all operation of the FIG. 1 structure is concerned, assume now that the hand lever 16 assembly illustrated in FIG. 1 is conventional, i.e., as shown in the Gurney et al. U.S. Pat. No. 2,875,637 of Mar. 3, 1959, and the control tube is axially and rotatably moved in response, respectively, to axial and rotary movement of the end of hand lever 16. In automatic transmission controls the axial movement is used for detent control, and the rotary movement actuates a transmission valve. In manual transmission controls, the hand lever embodies the conventional H-type shift arrangement, the usual REVERSE being the upper left leg, FIRST being the lower left, SECOND being the upper right, and THIRD being the lower right. NEUTRAL is the cross portion of the H.

As was indicated above, manual actuation of the lever 16 causes axial and/or rotational movement of the control tube 20 and its associated automatic transmission lever 22. Movement of the hand lever 16 to the left through the neutral or cross portion of the H moves the pin 74 mounted on the lever 22 toward the opening 80 in the R-1 lever 58; thereafter, movement of the hand lever 16 upward or downward rotates the shift lever 58 accordingly and actuates the proper gearing of the manual transmission (not shown) through suitable linkage connected to the openings 68.

When it is desired to shift into SECOND and then THIRD, the manual lever 16 is moved to the right through the cross portion of the H, causing the control tube 20 to move axially and the pin 74 on lever 22 to engage the opening 78 in the 2-3 lever 56. Then, of course, movement of the lever 16 upward and downward along the right hand legs of the H serves to rotate the shift lever 56 and actuate the proper gearing of the manual transmission via linkage (not shown) connected to the opening 66.

Refer now to FIGS. 4-8 for a modification of the lower end assembly 18. A bracket 82, formed in the shape of a figure "8" and including flanges 84 formed at an open end thereof, is clamped onto the steering column 12 and fixed against rotation by a suitable tongue 86 formed on the bracket and aligned with an indentation 88 formed in the steering column 12. The bracket 82 is tightened around the steering column 12 by means of a bolt 90 and nut 92 connected through openings 94 formed in the flanges 84 at the side of the steering column 12.

An offset, coaxial bearing support portion 96 is provided by the smaller loop of the figure "8"-shaped bracket 82, the smaller loop being formed by stripping out and bending a portion of the center third of the width of the bracket 82. A flanged pin 98 is rotatably mounted in the bearing support 96, with an extension 100 (FIG. 8) extending from one side thereof. Manual shift levers 102 and 104 are rotatably mounted on the pin extension 100, extending outwardly therefrom and positioned on opposite sides of the automatic transmission control lever 22. A U-shaped shift link 106 is fixedly secured to the control lever 22 by any suitable means, such as a bolt 108 and nut 110 mounted through an intermediate opening 112 formed therein. A selector pin assembly 70, similar to that illustrated in FIG. 1, is mounted through an opening 114 formed in one leg of the shift link 106, adjacent openings 116 and 117 (FIG. 7) formed in the shift levers 102 and 104, respectively. The selector pin assembly 70 structure is similar to that described above relative to FIG. 1. The shift levers include the usual openings 118 (FIGS. 5 and 6) for connection with the R-1 and 2-3 gears of a manual transmission, while an opening 119 formed near the outer end of the lever 22 permits connection with an automatic transmission.

The usual bearing assembly 120 (FIG. 4) is slidably mounted on the steering shaft 34 adjacent the end of a flanged bushing or cap 122 which is mounted against the end of the steering column 12 and around the control tube 20. The bearing 120 is biased in position by a spring 124 which engages an abutment 126 formed on the steering shaft 34.

Figure 9:
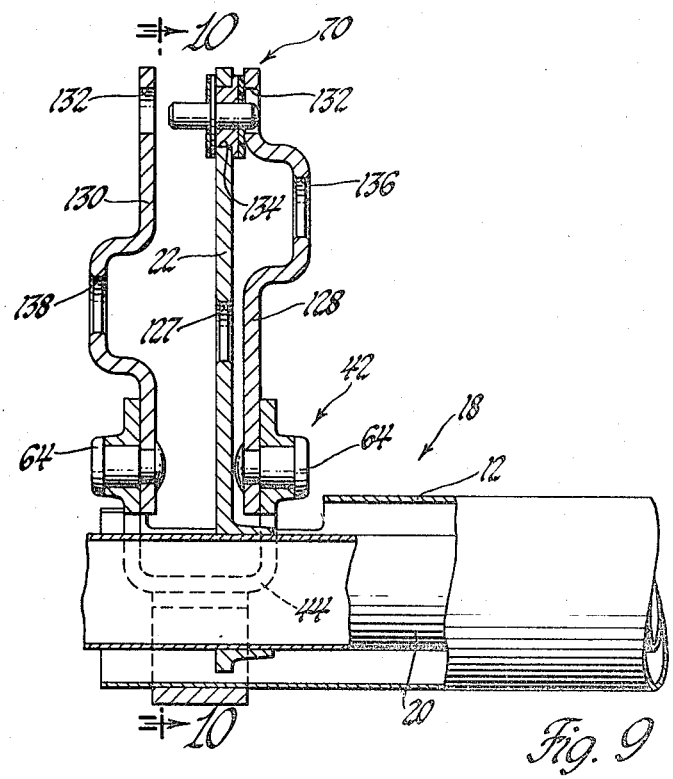
FIG. 9 is a fragmentary cross-sectional view of the lower control assembly illustrating a modification of the invention.
Figure 10:
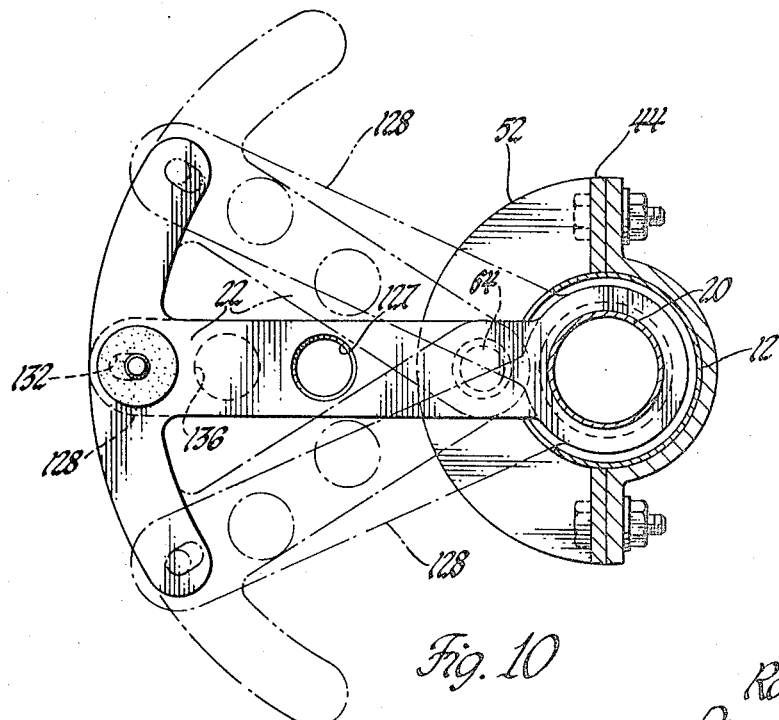
FIG. 10 is a cross-sectional view taken along the plane of line 10—10 of FIG. 9, as if FIG. 9 were a full round view, and looking in the direction of the arrows, illustrating different operating positions.
Figure 11:
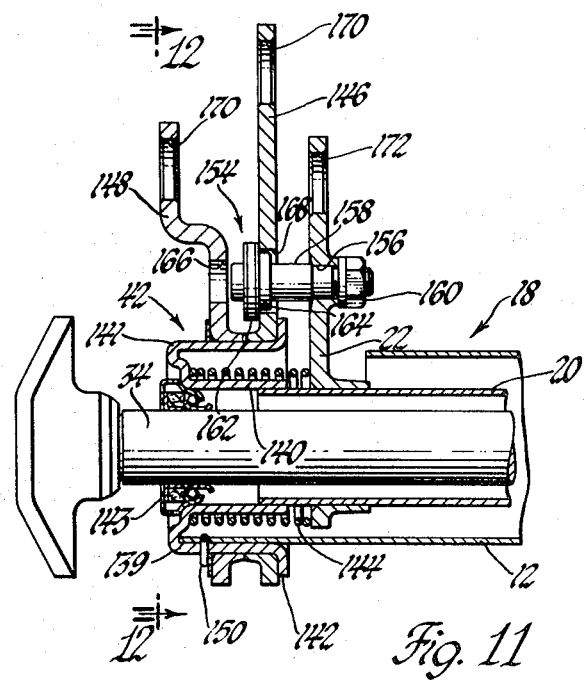
FIG. 11 is a fragmentary cross-sectional view of the lower control assembly illustrating a modification of the invention.
Figure 12:
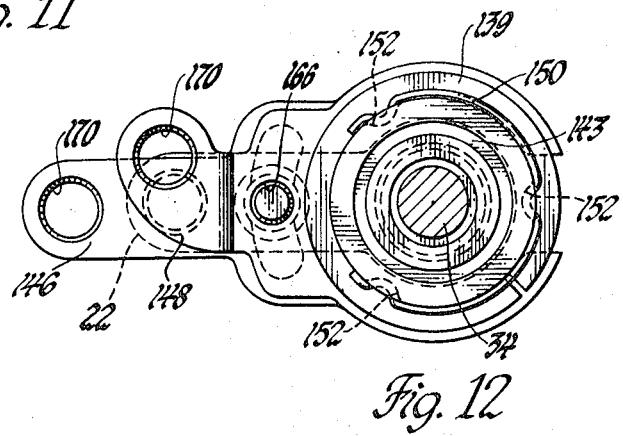
FIG. 12 is a view taken along the plane of line 12—12 of FIG. 11, as if FIG. 11 were a full round view, and looking in the direction of the arrows.

A further modification of the manual control assembly package 42 is illustrated in FIGS. 9 and 10. This assembly is similar to that illustrated and described relative to FIG. 1, and similar elements have been given the same reference numerals as in FIG. 1. Shift levers 128 and 130 each include openings 132 formed at the outer ends thereof for alignment with the selector pin assembly 70 which is mounted in an opening 134 adjacent the outer end of the control lever 22, rather than in an intermediate opening 127, as illustrated in FIG. 1. The intermediate opening 127 permits connection to an automatic transmission, when applicable. The shift levers 128 and 130 include the usual openings 136 and 138, respectively, for connection with the 2-3 gears and the R-1 gears, respectively, of a manual transmission.

In a further modification of the control assembly 18, FIGS. 11-14, the manual shift assembly 42 is readily added to a lower control assembly 18 by sliding the components of the assembly 42 onto the lower end of the steering column 12. The manual shift assembly 42 includes a circular cap 139 having inner and outer walls, 140 and 141, respectively, and one closed end. A flange 142 is formed around the open end of the outer wall 141. It is the inner side of the outer wall 141 which is slidably mounted around the steering column 12, the inner side of the inner wall 140 being slidably mounted around the lower end of the control tube 20. A suitable sealed bearing 143 is mounted around the steering shaft 34 against the closed end of the cap 139. A spring 144 is resiliently mounted around the inner wall 140 of the cap 139 between the closed end thereof and that portion of the automatic transmission control lever 22 which is secured to the control tube 20. Manual shift levers 146 and 148 are rotatably mounted around the outer wall of the cap 139, abutting against one another, while the lever 146 abuts against the flange 142. A retainer 150 is snapped into indentations 152 formed in the outer wall of the steering column 12 adjacent the other lever 148 to maintain the abutting relationship. Both the levers 146 and 148 are mounted on the same side of the automatic control lever 22.

A selector pin assembly 154 is fixedly secured through an opening 156 formed in the control lever 22, such as by a contoured stud 158 and nut 160. Flanges or steps 162 and 164 are formed near the end of the stud 158 such that the extreme outer end thereof may engage an opening 166 formed in the shift lever 148, while the flange 164 may engage a larger opening 168 formed in the other shift lever 146. The largest flange 162 formed on the stud 158 serves as a stop intermediate the shift levers 146 and 148. It may be noted that, as the control tube 20 is moved axially against the tension of the spring 144, the control lever 22 and the selector pin assembly 154 will move accordingly and engage one or the other of the shift levers. Openings 170 are formed near the outer ends of the shift levers for connection with the R–1 and 2–3 gears of the manual transmission (not shown), while opening 172 is provided for connection with an automatic transmission when applicable.

Figure 13:
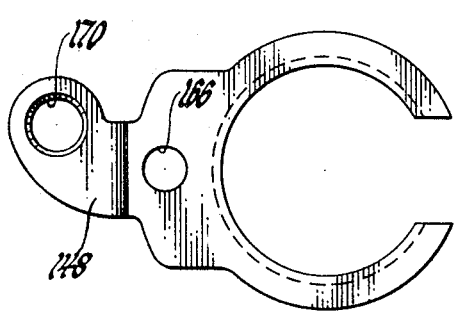
FIG. 13 is an end view of one of the elements included in FIGS. 11 and 12.
Figure 14:
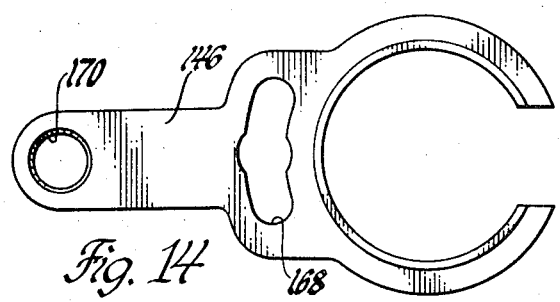
FIG. 14 is an end view of another of the elements included in FIGS. 11 and 12.

FIGS. 13 and 14 better illustrate the exact shape of the shift levers 148 and 146, respectively.

From the above discussion, it should be apparent that the invention provides a novel means for converting a standard automatic transmission lower control assembly into one which may be used with a manual transmission, without requiring a separate design therefor and without requiring the deletion or interchange of any of the parts thereof. Thus it should be apparent that only one type of lower control assembly need be shipped to an automobile assembly plant, the same being readily adaptable for use with either the automatic or manual transmission, the latter being accomplished by the addition of a synchromesh package assembly.

Although four embodiments of the invention have been disclosed and described, it is apparent that other modifications of the invention are possible within the scope of the appended claims.

We claim:

1. In a transmission control mechanism; an automatic transmission control assembly including a steering column, a control tube mounted on said steering column for relative rotary and axial control movement, a transmission control lever fixedly secured in a projecting position to said control tube and having connecting means for connecting an automatic transmission control thereto; and a manual transmission control modification assembly including first and second shift levers each having means for connecting a manual transmission control thereto, support means having pivot means for pivotably mounting said shift levers on said steering column axially adjacent said control lever and attaching means for securing said support means to said steering column of said assembled automatic transmission control assembly with said control lever fixed in said projecting position and permitting control movement of said control tube and lever, and selector means operatively connected to said control lever and shift levers for selectively engaging said first and second shift levers in response to axial reciprocal movement of said control tube for rotating the selected shift lever in response to rotation of said control tube and lever.

2. The mechanism described in claim 1, wherein said attaching means includes upper and lower brackets, means for clamping said upper and lower brackets together, a pair of semicircular flanges formed on said upper bracket, an opening formed in each of said flanges, rivet means associated with said openings for pivotably mounting said first and second shift levers on said semicircular flanges.

3. The mechanism described in claim 2, wherein a flange is formed along each parting edge of said lower bracket suitable for abutment against said upper bracket.

4. The mechanism described in claim 1, including an opening in said automatic transmission control lever and wherein said selector means includes a selector pin assembly mounted through said opening formed in said control lever.

5. The mechanism described in claim 4, wherein said selector pin assembly includes a bushing having a flange formed on one end thereof and the body thereof mounted in said opening, a pin mounted in said bushing and extending from each of the ends thereof, and a retainer mounted on said pin against the end of said body opposite said flanged end for retaining said bushing in said opening.

6. The mechanism described in claim 1, wherein said control tube is concentrically mounted on said steering column.

7. In a transmission control linkage, a steering column, a control tube concentrically mounted in said steering column for relative rotary and axial movement, an automatic transmission control lever fixedly secured to said control tube, upper and lower brackets mounted on said steering column, means for clamping said upper and lower brackets together, a pair of semicircular flanges formed on said upper bracket, an opening formed in each of said flanges, first and second manual transmission shift levers, an opening formed intermediate the ends of each said shift levers, rivet means associated with said openings formed in said flanges for pivotably mounting said first and second shift levers on said semicircular flanges, an opening formed adjacent the outer end of said automatic transmission control lever, and selector means mounted through said automatic transmission control lever opening, said selector means including a bushing having a flange formed on one end thereof and having the body thereof mounted in said opening, a pin mounted in said bushing and extending from each of the ends thereof, and a retainer mounted on said pin against the end of said body opposite said flanged end for retaining said bushing in said opening, said pin being aligned with said openings formed in said manual transmission shift levers.

8. The mechansm described in claim 1, wherein said first-mentioned means includes a figure "8"-type bracket, one of the loops of said figure "8" being split and having a flange formed along each parting edge thereof, means for connecting the flanges once the split loop is mounted around said steering column, a pin mounted through the closed loop of said figure "8" bracket and having a portion thereof extending from one end thereof, said first and second shift levers being rotatably mounted on said extension, a link secured to and extending from said automatic transmission control lever between said first and second manual transmission shift levers, and an opening formed in said link intermediate said shift levers.

9. The mechanism described in claim 8, wherein said last-mentioned means of claim 1 includes a selector pin assembly mounted through said opening formed in said link.

10. The mechanism described in claim 9, wherein said selector pin assembly includes a bushing having a flange formed on one end thereof and the body thereof mounted in said opening, a pin mounted in said bushing and extending from each of the ends thereof, and a retainer mounted on said pin against the end of said body opposite said flanged end of retaining said bushing in said opening.

11. In a transmission control linkage, a steering column, a control tube concentrically mounted in said steering column for relative rotary and axial movement, means for moving said control tube, an automatic transmission control lever fixedly secured to said control tube, a figure "8"-type bracket, one of the loops of said figure "8" being split and having a flange formed along each parting edge thereof, means for connecting the flanges once the split loop is mounted around said steering column, a stud mounted through the closed loop of said figure "8" bracket and having a portion thereof extending from one end thereof, first and second manual transmission shift levers, said first and second shift levers being pivotably mounted on said extension, a link secured to and extending from said automatic transmission control lever between said first and second shift levers, an opening formed in said link intermediate said manual transmission shift levers, and a selector pin assembly mounted through said opening formed in said link, said selector pin assembly including a bushing having a flange formed on one end thereof and having the body thereof mounted in said opening, a pin mounted in said bushing and extending from each of the ends thereof, and a retainer mounted on said pin against the end of said body opposite said flanged end for retaining said bushing in said opening.

12. In a transmission control linkage, a steering column, a control tube concentrically mounted in said steering column for relative rotary and axial movement, an automatic transmission control lever fixedly secured to said control tube, upper and lower brackets mounted on said steering column, means for clamping said upper and lower brackets together, a pair of semicircular flanges formed on said upper bracket, an opening formed in each of said flanges, first and second manual transmission shift levers, an opening formed adjacent the outer end of each of said shift levers, rivet means associated with said openings formed in said flanges for rotatably mounting said first and second manual transmission shift levers on said semicircular flanges, an opening formed adjacent the outer end of said automatic transmission control lever, and selector means mounted through said control lever opening, said selector means including a bushing having a flange formed on one end thereof and having the body thereof mounted in said opening, a pin mounted in said bushing and extending from each of the ends thereof, and a retainer mounted on said pin against the end of said body opposite said flanged end for retaining said bushing in said opening, said pin being aligned with said openings formed in said manual transmission shift levers.

13. The mechanism described in claim 1, wherein said support means includes a circular cap having inner and outer walls and one closed end, a flange formed around the open end of the outer wall, said outer wall being fitted around said steering column and said inner wall being fitted around said control tube, resilient means mounted within the space between said inner and outer walls and having the ends thereof abutted against the closed end of said cap and said control lever, said first and second manual transmission shift levers being pivotably mounted around said outer wall, one of said shift levers being abutted against said flange and the other of said shift levers being abutted against said first shift lever, and retainer means mounted on said outer wall for retaining said first and second shift levers in an abutting relationship.

14. The mechanism described in claim 1, wherein aligned openings are formed through said automatic transmission control lever and manual transmission shift levers, and said selector means includes a contoured stud having a portion thereof fixedly secured in said control lever opening and two other portions suitable for alternate engagement with said shift lever openings upon reciprocal movement of said automatic transmission control lever.

15. In a transmission control linkage, a steering column, a control tube mounted on said steering column for relative rotary and axial movement, an automatic transmission control lever fixedly secured to said control tube, an abutment formed on said lever around said control tube, a cap fixedly secured to the lower end of said steering column and slidably mounted around the lower end of said control tube, resilient means mounted between said cap and said abutment, a flange formed on the upper end of said cap around said steering column, a first manual transmission shift lever mounted around said cap adjacent said flange, a second manual transmission shift lever mounted around said cap adjacent said first shift lever, means for holding said first and second manual transmission shift levers in abutting relationship, and means fixedly secured to said automatic transmission control lever for alternately engaging said first and second manual transmission shift levers upon axial movement of said control tube.

16. The mechanism described in claim 15, wherein aligned openings are formed through said automatic transmission control lever and manual transmission shift levers, and said selector means includes a contoured stud having a portion thereof fixedly secured in said control lever opening and two other portions suitable for alternate engagement with said shift lever openings upon reciprocal movement of said automatic transmission control lever.

References Cited
UNITED STATES PATENTS

| | | | |
|---|---|---|---|
| 2,924,988 | 2/1960 | Primeau | 74—473 |
| 3,025,715 | 3/1960 | Grady | 74—484 |
| 3,049,023 | 8/1962 | McCordic | 74—484 |

MILTON KAUFMAN, Primary Examiner

U.S. Cl. X.R.

74—473